Dec. 23, 1969   R. LINNEMANN ET AL   3,485,340
MEANS FOR CONVEYING CONSTRUCTION MATERIAL WITHIN A TUNNEL
SHAPED STRUCTURE SUCH AS A ROTARY KILN
Filed March 25, 1968                                 2 Sheets-Sheet 1

INVENTORS
ROLD LINNEMANN
ERNST VOSS

BY *Wenderoth, Lind & Ponack*
ATTORNEYS

United States Patent Office 3,485,340
Patented Dec. 23, 1969

3,485,340
MEANS FOR CONVEYING CONSTRUCTION
MATERIAL WITHIN A TUNNEL SHAPED
STRUCTURE SUCH AS A ROTARY KILN
Rolf Linnemann, Schwenningen (Neckar) and Ernst Voss, Singen-Hohentwiel, Germany, assignors to Didier-Werke A.G., Wiesbaden, Germany
Filed Mar. 25, 1968, Ser. No. 715,917
Claims priority, application Germany, Mar. 29, 1967, D 52,655
Int. Cl. B65g 41/00
U.S. Cl. 198—126          6 Claims

ABSTRACT OF THE DISCLOSURE

Device for conveying construction material for the lining of a tunnel-shaped structure such as a rotary kiln preferably above the longitudinal central axis. A support is arranged horizontally parallel to the longitudinal axis of the structure with guide rails for a cart. Telescopic support props extend transversely of the longitudinal central axis of the structure supporting the support. A frame is mounted on the cart supporting a motor having a friction wheel on the free end of its operating shaft. The friction wheel extends transversely to the longitudinal axis of the support and a conveyor ring engages the friction wheel with pivotally mounted conveying elements mounted on the exterior of the ring and the ring encircles the support.

---

Figure 1:
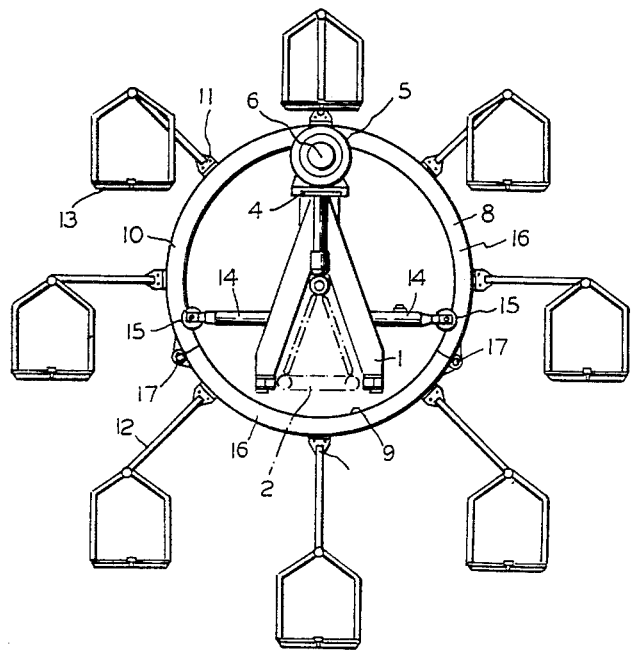

This invention relates to a device for conveying construction material for the lining of tunnel shaped structures particularly rotary kilns.

An object of the invention is to provide telescopic supporting means positioned transversely to the longitudinal axis of the tunnel shaped construction for supporting a support for movable carts upon which are mounted means for conveying the construction material.

A further object is to provide movable auxiliary mountings having movable pivotable working platforms to convey the material to the required position.

A still further object is to provide a construction wherein a cart is movable on a support extending between two horizontally transversely extending supports upon which a motor is provided with a profiled friction wheel and a conveyor ring having material conveying means is rotated by such a friction wheel.

A still further object of the invention is to provide working platforms which may be loaded with the required material at the lower surface of the tunnel shaped structure and then sequentially raised toward the top of such structure to the desired working position.

A still further object is to provide working platforms which are rotatably mounted so as to maintain their horizontal position at all times.

Figure 2:
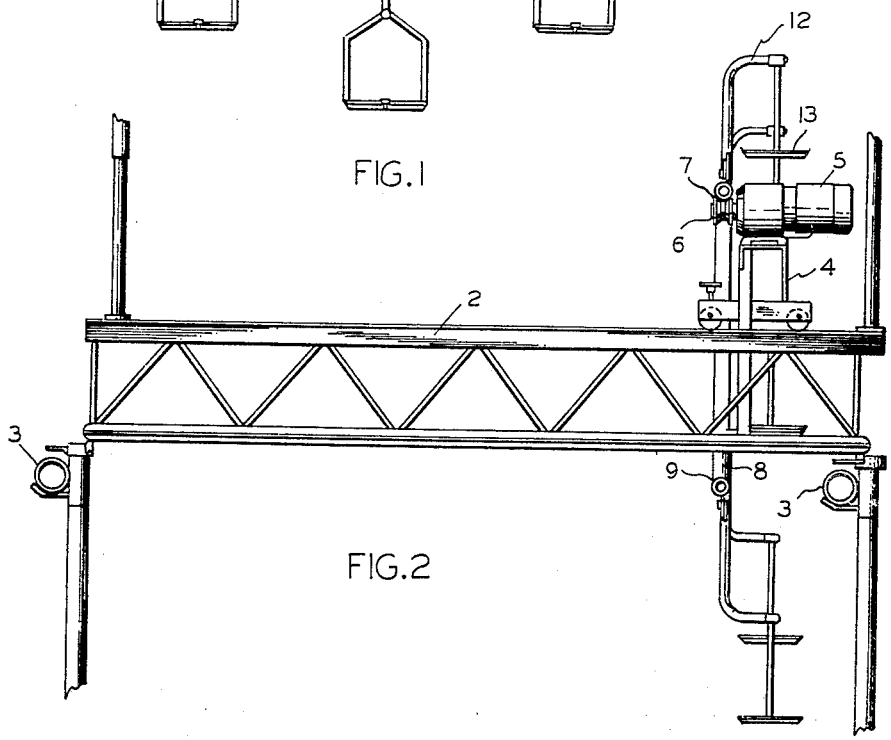
Figure 3:
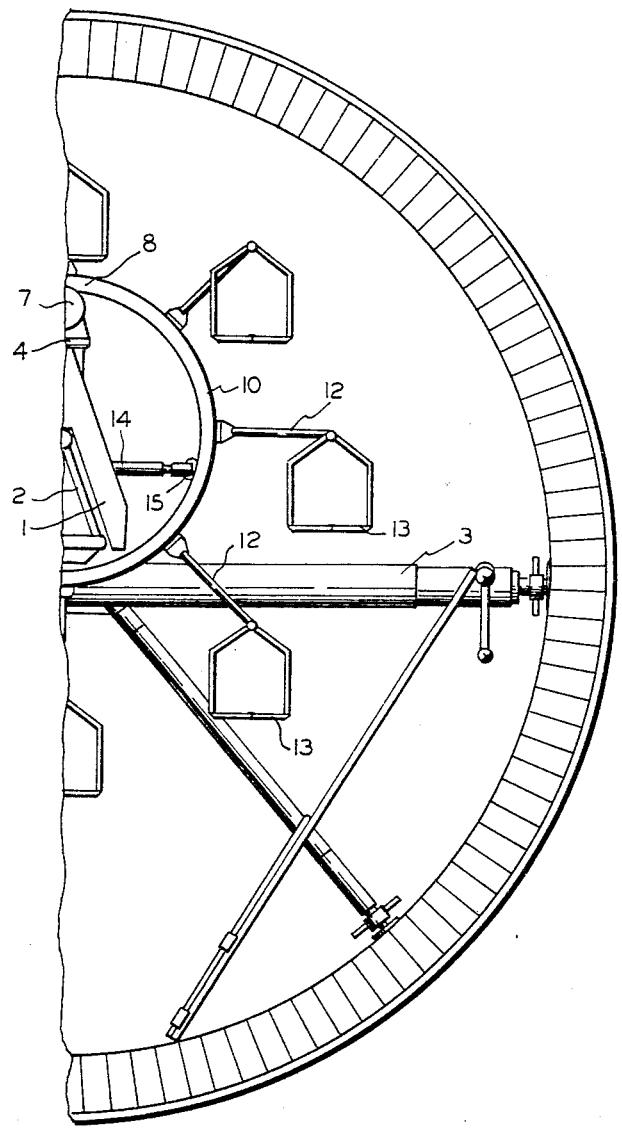

With the above and other objects in view which will become apparent from the detailed description below, a preferred embodiment of the invention is shown in the drawings wherein:

FIGURE 1 is a schematic front view of the device.
FIGURE 2 is a partial schematic cross-sectional view, and
FIGURE 3 illustrates schematically a half portion of the device located within a rotary kiln.

A cart 1 is movable on a beam-like support 2. The support 2 is part of a movable auxiliary device of horizontally placed telescopic support props 3 constructed in the structure to be lined. Guide rails are provided on the support and the cart 1 is movable thereon with working platforms and working devices (not shown). The support 2 bridges the area between two horizontally placed support struts 3 which extend transversely of the central longitudinal axis of the structure.

A frame 4 is arranged on the cart 1 which carries the motor 5. The operating shaft 6 of the motor 5 extends parallel to and centrally at a distance above the support 2. The operating shaft 6 is provided at its free end with a profiled friction wheel 7 extending transversely to the longitudinal axis of the support 2. On the profiled friction wheel 7 a conveyor ring 8 is mounted having a profiling opposed to that of friction wheel 7 and encircles support 2 with its interior edge 9.

On the exterior edge 10 of the conveyor ring 8 the conveying elements 11 are fastened at one end. The conveying elements 11 have supporting portions 12 which are bent rectangularly and extend in the direction of the longitudinal central axis of the support 2 and on such portions swingable support pans 13 are hinged in the plane of the conveyor ring.

For guiding the conveyor ring 8, support struts 14 are arranged on the frame 4 extending horizontally in the plane of the conveyor ring. The support struts 14 are provided at their free ends with guide rollers 15 which are profiled according to the profiling of friction wheel 7. At least one of the support struts 14 is adjustable in length.

In order to mount the conveyor ring 8 without any difficulty it is preferably constructed of at least two parts such as parts 16. The ring parts 16 are then connected with each other by plug bolt connections 17.

We claim:
1. Device for the conveyance of construction material for the construction of parts of a tunnel-shaped structure such as a rotary kiln preferably above the longitudinal central axis comprising a support arranged horizontally parallel to the longitudinal axis of the structure, guide rails supported by said support, a cart movable on said rails, support props spaced along the longitudinal central axis of said structure supporting said support, a frame mounted on said cart, a motor on said frame having a friction wheel on the free end of its operating shaft, said operating shaft extending parallel and centrally spaced from said support, and said friction wheel extending transverse to the longitudinal axis of said support, a conveyor ring encircling said support engaging said friction wheel and pivotally mounted conveying elements mounted on the exterior of said ring.

2. A device as set forth in claim 1 wherein said conveying elements comprise radially extending rods having a portion bent at right angles to extend in the direction of the longitudinal axis of said support upon which said conveying elements are pivotally mounted.

3. A device as set forth in claim 1 wherein support struts for said conveyor ring are mounted below the central point of said conveyor ring on said frame.

4. A device as claimed in claim 3 wherein said support struts are provided with guide rollers.

5. A device as set forth in claim 3 wherein at least one support strut is adjustable in length.

6. A device as set forth in claim 1 wherein said conveyor ring comprises a plurality of parts which are connected by plug bolt connections.

References Cited

UNITED STATES PATENTS

| | | | |
|---|---|---|---|
| 570,322 | 10/1896 | Mansfeld | 198—211 X |
| 2,161,750 | 6/1939 | Schonwald | 198—211 |
| 3,062,392 | 11/1962 | Eppard | 214—14 |

GERALD M. FORLENZA, Primary Examiner

G. F. ABRAHAM, Assistant Examiner

U.S. Cl. X.R.

198—211